United States Patent Office 3,301,949
Patented Jan. 31, 1967

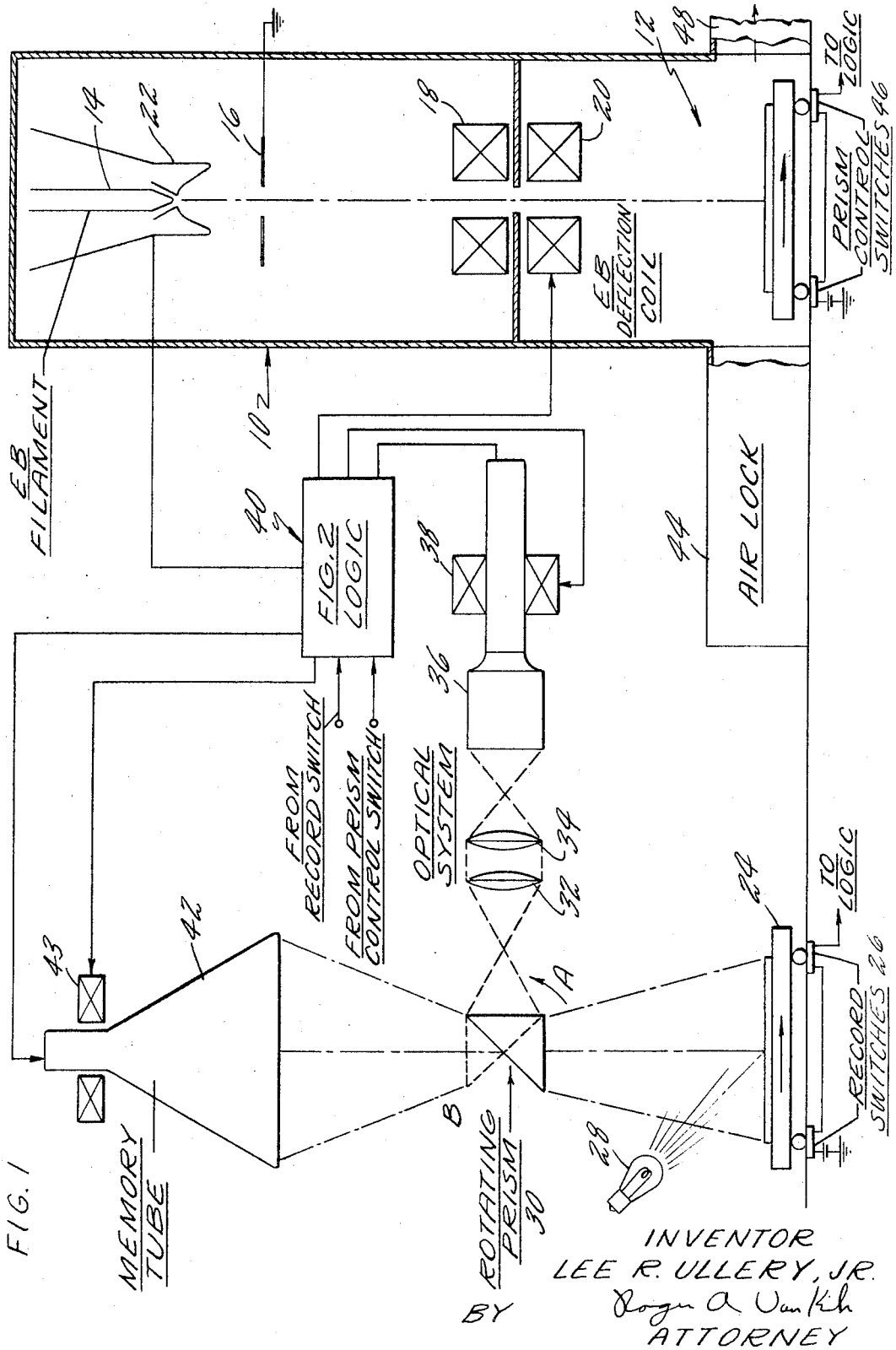

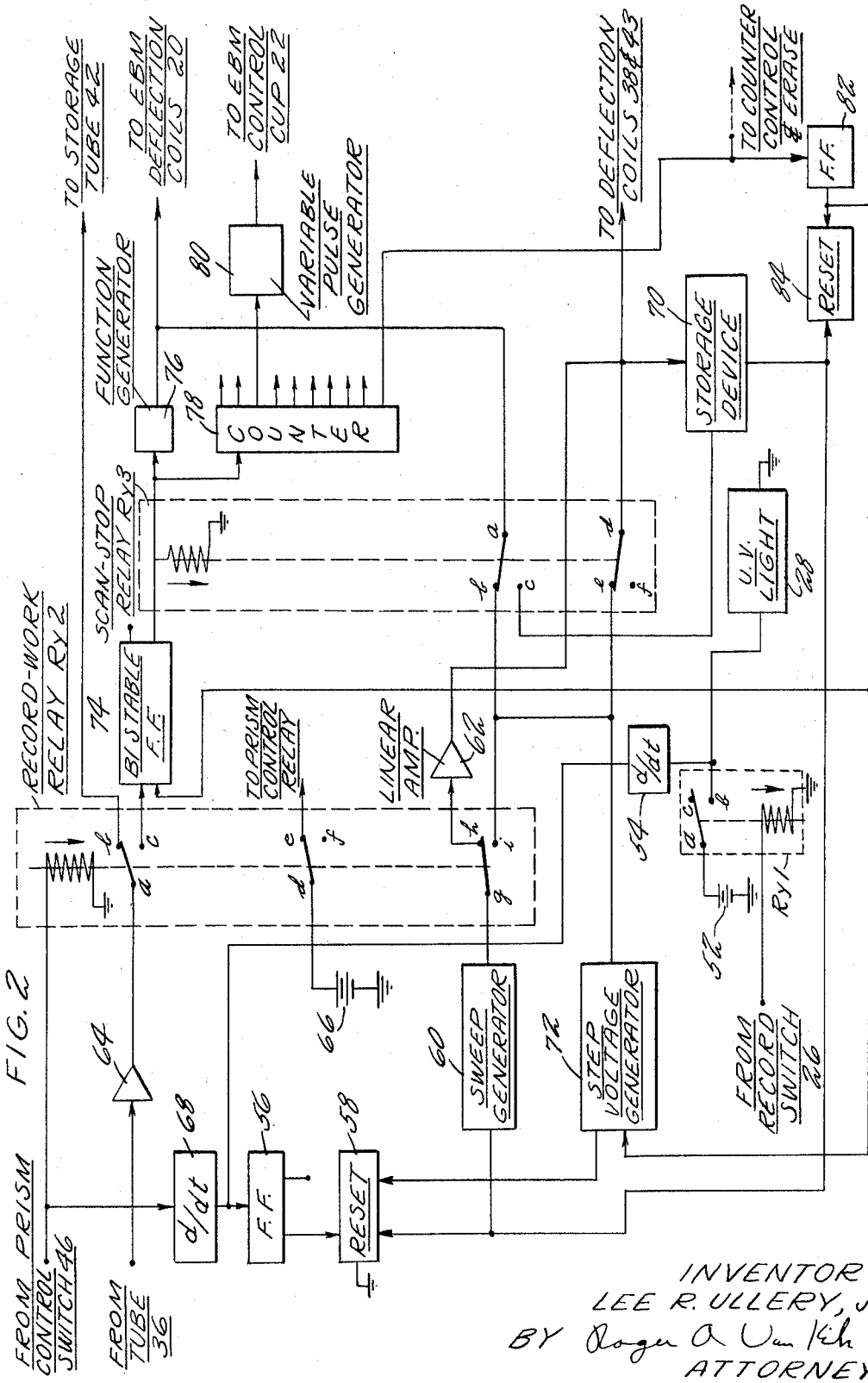

3,301,949
STORED IMAGE CONTROL SYSTEM FOR
BEAM MACHINING
Lee R. Ullery, Jr., Simsbury, Conn., assignor to United
Aircraft Corporation, East Hartford, Conn., a corporation of Delaware
Filed Mar. 2, 1964, Ser. No. 348,634
8 Claims. (Cl. 178—6.8)

This invention relates to automating the operation of a device which utilizes an energized beam to weld, cut or machine a workpiece. More particularly, this invention is directed to apparatus which permits automating a device which utilizes an intense beam of charged particles or photons to perform work at a plurality of points located on a workpiece.

While not limited thereto, this invention has particular utility for the control of an electron beam tool which is being used for the assembly or packaging of electronic circuitry. Due to errors in fixturing, tolerances in lead location, or simply the desire to weld at random points in the plane of the workpiece, it has in the past been extremely difficult to automatically assemble such circuits. For a thorough explanation of some of the problems which precipitated the aforementioned difficulty, particularly as they affected electron beam assembly techniques, which this invention is intended to overcome and a discussion of the many unique advantages inherent in utilizing an electron or photon beam as the joining tool in the assembly of electronic circuits, reference may be had to pages 1–5 of my copending application, Serial No. 274,177, filed April 19, 1963, now U.S. Patent No. 3,267,250.

It is an object of this invention to provide for the automation of a device which utilizes a highly energized beam to perform work at various points on a workpiece.

It is another object of this invention to provide for the automatic performance of operations at non-predetermined positions on a workpiece.

It is also an object of this invention to sense the location of points on a workpiece where it is desired to have an energized beam impinge and to store information concerning these sensed locations.

It is a further object of this invention to sense, store and then read out the location of points on a workpiece where it is desired to have a highly energized beam impinge.

It is still another object of this invention to eliminate the precision locational requirements which were formerly placed on workpieces which were to be subject to machining with an energized beam.

It is another object of this invention to reduce the cost of performing a precision operation on a remotely located workpiece by substantially lessening fixturing tolerances.

It is also an object of this invention to provide increased flexibilty for automated welding and machining tools.

It is yet another object of this invention to automatically position a tool for working materials at desired points in response to the read out of a stored image of the workpiece.

These and other objects of this invention are accomplished by novel apparatus which scans an image of a workpiece and stores the scanned image. After having been scanned and its image stored, the workpiece will be moved into position in line with a device which generates a highly energized beam. When the workpiece is properly positioned, the stored image thereof will be scanned and work initiation signals will be generated whenever the scanning means senses indicia on the image indicative of the occurrence of a point where work is to be performed. The scanning of the stored image and the deflection of the energized beam are synchronized so that, in response to a work intiation signal, a highly energized beam will be generated which will impinge upon the point on the workpiece where the work is to be performed.

This invention may be better understood and its numerous advantages will become apparent to those skilled in the art by reference to the accompanying drawing wherein like reference numerals refer to like elements in the various figures and in which:

FIGURE 1 is a block diagram of this invention used in conjunction with an electron beam machine.

FIGURE 2 is a block diagram of the control circuitry of the device shown in FIGURE 1.

Referring now to FIGURE 1, the apparatus shown utilizes an electron beam machine 10 to perform the desired work on a workpiece. U.S. Patent No. 2,987,610, issued June 6, 1961, to K. H. Steigerwald, discloses an electron beam machine of the type suitable for use with this invention. As explained in the Steigerwald patent, electron beam machines are devices which use the kinetic energy of an electron beam to work a material. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which cause an increase in the temperature within the impingement area sufficient to accomplish work. Present state of the art electron beam machines, as a result of recently developed refinements in electron optics, can provide a beam focused to produce power densities on the order of 10 billion watts per square inch. In order to achieve such beam power density, the electrons are accelerated through a potential of approximately 100,000 kv. or to a velocity 0.55 that of the velocity of light and are focused into a beam which has a diameter of less than 0.0005 inch at the point of impingement on the work. In the fabrication of electronic circuits, it is possible to utilize such a beam to perform such functions as scribing thin film components or welding leads from devices to terminal pads on a substrate board. While this invention was primarily designed for the automatic interconnection of circuit components by automatically welding the leads thereon to terminal pads on substrates, it obviously may be used to control any electron beam machining or welding operation.

In FIGURE 1, the electron beam machine is indicated generally at 10 and comprises an evacuated work chamber 12. Machine 10 also comprises an electron beam column which is in communication with chamber 12 and which contains a source of electrons, beam forming means and beam focusing means. The source of electrons comprises a directly heated cathode 14 which is supplied with heating current from a filament current supply, not shown. Also connected to cathode 14 is the negative terminal of a source of electron accelerating voltage, also not shown. An apertured anode 16 is positioned in the electron beam column between cathode 14 and the workpiece. Anode 16 is connected to the case of the machine which is grounded. Also connected to ground is the positive terminal of the acceleration voltage supply. The difference in potential between cathode 14 and anode 16 causes the electrons emitted from the cathode to be accelerated down the column toward the workpiece. The electrons are focused into a beam by an electron optical system comprising a plurality of adjustment coils and diaphragms, not shown, and a magnetic lens assembly 18 which is supplied with focusing current from a lens current supply, not shown. The focused electron beam may be deflected across the surface of the workpiece by varying the voltage applied to two pairs of deflection coils, only one of which 20 is shown.

Positioned adjacent cathode 14 is a control electrode 22. This control electrode may be of the Wehnelt cylinder type such as disclosed in U.S. Patent No. 2,771,568, issued November 20, 1956, to K. H. Steigerwald. The control electrode is connected to the negative terminal of a bias voltage supply and is normally maintained at a potential which is more negative than the potential applied to cathode 14. Thus, the working electron beam is normally blocked or biased off.

While not in all cases necessary for proper operation of this invention, it is usually desirable that a preliminary step be performed before the image of the workpiece is stored. This step consists of the application of a dot of fluorescent dye to each of the points where work is to be performed. Thus, in the case where the workpiece comprises a substrate with a plurality of unattached electronic circuit components properly positioned thereon, the leads extending from each of the components is first marked with fluorescent dye. Once the circuit is assembled by manually positioning the components on the substrate and marking the leads with dye, the assembly is placed in a fixture. The fixture is then precisely positioned on a movable table 24 manually. Movable table 24 is then in turn positioned so that its wheels or cams carried by the table cause the closing of a pair of series connected Record switches 26. In a manner which will be described below, closing of Record switches 26 result in the energizing of ultraviolet light source 28. The light from source 28 will cause each of the dots of dye previously applied to the workpiece to indicate where a weld is to be made to fluoresce brightly. Record switches 26 are so located that they will be closed only when a movable table 24 is accurately positioned under a rotating prism 30. Rotating prism 30 will, with a table positioned over switches 26, be in the position A as shown in FIGURE 1. Thus, the image of the workpiece will be reflected through prism 30 to an optical system comprising a pair of lenses 32 and 34. Lenses 32 and 34 will focus the reflected image of the workpiece on the photo-cathode of a TV camera tube 36. Camera tube 36 may be any of the well-known types of tubes such as an image orthicon or a vidicon. If desired or necessary, optical filters may be positioned between the optical system and the photo-cathode of tube 36 so that only light from the dye-marked areas is projected on the tube. Closing of switches 26 also causes the image orthicon to begin scanning the image of the workpiece by controlling the application of a scanning or deflection voltage to the deflection coils 38 of tube 36. Whenever a bright spot on the image indicative of a dye-marked point is scanned, the image orthicon will generate a relatively large output signal. The output of the image orthicon will be applied, by logic control unit 40, to the control grid of a storage or memory tube 42. Storage tube 42 may be any one of the well-known storage tubes such as a Memotron or Iatron or, preferably, one which presents an image of the stored information. In the well-known manner, the output of image orthicon 36 will modulate storage tube 42 so that the image on the photo-cathode of the image orthicon will be stored on the screen of the memory tube. Obviously, it is necessary to synchronize the orthicon system to the Memotron. This is accomplished by logic unit 40 which applies a sweep or deflection voltage from the same deflection voltage generator to deflection coils 38 of the image orthicon and deflection coils 43 of the storage tube.

Once the image of the workpiece has been stored, table 24 will be moved into an entrance air lock 44 which is then evacuated by means, not shown. Next, the table carrying the workpiece is moved into work chamber 12 of electron beam machine 10 and positioned so that it causes closing of series connected Prism Control switches 46. It should be noted that the movement of table 24 will, in the usual case, be automatically controlled. Table 24, for example, may be located on tracks, not shown, and will carry a table drive motor. A control voltage for the motor may be supplied in a conventional manner such as by means of a third rail. The closing of switches 46 causes a control signal to be transmitted to logic unit 40 which, in the manner to be described below, orders a sequence of operations which result in the activation of the electron beam machine and the deflection of the beam to the points which were previously dye marked. Briefly, upon the closing of switches 46, prism 30 is caused to rotate to position B as shown by the dotted lines in FIGURE 1. In this position, the image stored in storage tube 42 will be reflected by the prism and focused by the optical system on the photo-cathode of image orthicon 36. The stored image is then scanned in the same manner as the original image was scanned. As the photo image at the orthicon is scanned, the scanning beam will arrive at a point on the photo-cathode at which a spot of light from the memory tube has been imaged. This spot of light, indicative of a dye-marked point on the workpiece, will be detected by the orthicon and a signal will be generated in response to such detection which will overcome the blocking bias on the electron beam machine's control electrode 22. As scanning in the orthicon frame of reference is carried out, current is delivered from the same deflection voltage generator to the electron beam machine's deflection coils 20 so that the beam, if gated on, would be located at the same relative point in its frame of reference. Due to the synchronized scanning of the image and the electron beam machine's deflection voltage, the electron beam will be gated on at the proper times to cause it to impinge upon the dye-marked spots on the workpiece. After the desired work has been performed, table 24 is moved into an exit air lock 48 and a second table containing a workpiece is moved into position under prism 30. As should be obvious, to speed up the process, a dual storage readout system duplicating that shown in FIGURE 1 may be utilized so that there will always be a piece to be worked waiting in entrance air lock 44 for the completion of a work cycle. Since the time to perform the desired work is considerably longer than that needed to store the image of the workpiece, while a first control system is being used to control the electron beam machine a second control system may store an image of a second workpiece, transmit the table into the entrance air lock and pump down the air lock.

Turning now to FIGURE 2, there is shown a block diagram of one embodiment of a control system which may be utilized as logic unit 40 in the embodiment of FIGURE 1. It is to be understood, however, that the embodiment of FIGURE 2 is meant to be representative only and alternative methotds, some of which will be briefly discussed below, can be employed for control purposes. As is shown in FIGURE 1, the inputs to logic unit 40 consist of the output signal from image orthicon 36 and a pair of D.C. signals generated by the closing of switches 26 and 46. With the movable table positioned under prism 30, series connected Record switches 26 will be closed thereby causing current flow from D.C. supply 49 of FIGURE 1 through the coil of relay Ry1. Activating of relay Ry1 causes closing of contacts $a$ and $b$ thereof thereby permitting current to flow from a source 52 through ultraviolet light 28. The voltage from source 52 is simultaneously applied to the input of a differentiator-limiter 54. In the manner well known in the art, differentiator 54 will produce an output pulse each time relay Ry1 is closed by positioning the table over switches 26. The output pulse from differentiator 54 is applied to a monostable multivibrator 46 causing it to change its conductive state and produce an output signal of predetermined duration. The output pulse from multivibrator 56 is applied to a reset circuit 58. The purpose of reset circuit 58 is to cause sweep generator 60 to initiate generation of saw-tooth voltages which, in the record mode of operation, are applied to the horizontal and vertical deflection coils 38 of image orthicon 36 and to deflection coils 43 of the memory tube 42. Sweep generator 60 comprises fixed frequency, free-running oscillators which generate saw-tooth output voltages through the charging of capacitors. Reset circuit 58 merely provides, upon receipt of a signal from multivibrator 56, a discharge path to ground for the capacitors. For reasons which will be obvious from the discussion below, in the record mode, the saw-tooth voltage is amplified by amplifier 62 before being applied to deflection coils 38 and 43 via contacts g and h of relay Ry2. Upon the closing of Record switches 26, the ultraviolet light will be turned on and image orthicon 36 will begin to scan the image of the workpiece. As the image orthicon scans the photo image dissecting it into bits of electronic information, a correlated signal is delivered to the memory tube which modulates the beam intensity of its writing gun. Thus, when a bright spot on the image, corresponding to a dye-marked point on the workpiece, is scanned by the image orthicon, the output signal therefrom will show a sharp increase in magnitude. In the record mode, the output from image orthicon 36 is applied to an amplifier 64 and thence through contacts a and b of record-work relay Ry2 to the grid of the memory tube. At this point it should be noted that all of the switches controlled by relay Ry2 are normally closed, via spring biasing, to their upper contacts during the record mode. Thus, in this mode, the current from a D.C. source 66 will be applied through contacts d and e of relay Ry2 to a prism control relay, not shown, which holds prism 30 in position A as shown in FIGURE 1. After the image of the workpiece has been stored on the screen of memory tube 42, table 24 is, in the manner explained above, positioned in work chamber 12 of the electron beam machine in such a manner as to close series connected switches 46. Moving of table 24, of course, opens switches 26 thereby shutting off ultraviolet light 28. The opening of the contacts of relay Ry1 does not, however, cause the triggering of multivibrator 56 since differentiator 54 includes a limiter which only passes positive polarity pulses. Such differentiator-limiters are well known in the art. The closing of switches 46 permits current to flow from D.C. source 50 of FIGURE 1 through the coil of relay Ry2 thereby causing the three switches controlled by this relay to be closed to their lower contacts. Simultaneously, the voltage from the source supplying the relay current will be applied to a second differentiator-limiter 68 which will produce an output pulse only at the instant switches 46 are closed. In the manner described above, the output pulse from differentiator 68 triggers multivibrator 56 which in turn, through reset circuit 58, clears and starts sweep generator 60. The output of sweep generator 60, through contacts g and i of relay Ry2, is applied to a storage device 70 via normally closed contacts d and e of a relay Ry3. At the same time sweep generator 60 is being reset, a step voltage generator 72 is also being reset. The purpose of step voltage generator 72, which may be any of several known devices, is to generate a D.C. voltage which increases stepwise. Thus, for example, generator 72 may be a rotary switch which connects to various taps on a D.C. supply. The output voltage from generator 72 is used to provide a D.C. deflection voltage which will permit the stored image to be scanned in incremental fashion. The output of step voltage generator 72 is applied to storage device 70 wherein it is added to the voltage from sweep generator 60. The voltages from sweep generator 60 and step voltage generator 72 are both, via normally closed contacts a and b of relay Ry3, applied to deflection coils 20 of the electron beam machine. Simultaneously, these two voltages are also applied to deflection coils 38 and 43 respectively of image orthicon 36 and memory tube 42. Scanning of the memory tube deflection voltages, however, has no effect since operation of relay Ry2 has removed the output of the orthicon from its grid and the memory tube's writing gun thus remains cut off. The combined voltages from sweep generator 60 and step voltage generator 72, as applied to deflection coils 20 and 38, cause the image to be scanned in small increments. That is, the step voltage will bias the scanning and working beams to a series of points in the X and Y coordinates and the output of sweep generator 60 will cause both beams to scan the area between the coordinates determined by the existing step voltage and that which will be generated by the next increment of step voltage. It should be obvious that, if the control system of FIGURE 2 is utilized, no more than one operation can be performed within each segment of the workpiece corresponding to an incremental area of the scanned image.

As noted in the above record mode, the output of the image orthicon is a signal whose magnitude varies with the intensity or brightness of the image stored. When the image orthicon scans a bright spot on the image corresponding to a dye-marked point, an output signal will be produced which, after amplification in amplifier 64, will have sufficient magnitude to trigger a bistable multivibrator 74. The output signal from amplifier 64 is applied to multivibrator 74 via contacts a and c of relay Ry2 which have been closed due to the closing of switches 46. Triggering of bistable multivibrator 74 causes it to change its conductive state thereby producing an output signal on the one of its output terminals which is connected to the coil of relay Ry3. Relay Ry3 is thus activated and the various switches controlled thereby are closed to their lower contacts. This action removes the outputs of sweep generator 60 and step voltage generator 72 from the deflection coils of the electron beam machine and image orthicon and also from the input to storage device 70. Simultaneously, the voltage stored in storage device 70 will be applied through now closed contacts a and c of relay Ry3 to deflection coils 20 of the electron beam machine. Thus, scanning of the deflection voltage of the electron beam machine will be halted at a point corresponding to a point on the image which calls for the performance of work. The output of multivibrator 74 is also applied to a function generator 76 and a counter 78. The purpose of function generator 76 is to generate D.C. deflection voltage which is added to the voltage applied to deflection coils 20 from storage device 70. This small additional deflection voltage generates a magnetic field sufficient to cause the beam to step up and over until it impinges on the center of the region to be worked. This additional deflection is necessary since scanning will automatically cease as soon as the edge of a bright spot is sensed. For a more complete description of the purpose of function generator 76, reference may be had to the description of FIGURE 4 appearing at page 17 of my above mentioned copending application Serial No. 274,177. Upon the activation of function generator 76, counter 78 begins to count. It is the function of counter 78 to provide a short time delay before the electron beam is gated on. This time delay is necessary to enable the function generator 76 to generate the voltage which will vary the combined beam deflecting fields in such a manner as to cause the beam to impinge upon the center of the area to be worked. In order to accomplish the foregoing, the counter 78 may be a free-running multivibrator driving a ring counter of the type well known in the art. Upon the appearance of a signal at the output of multivibrator 74, the free-running multivibrator will begin providing pulses to the ring counter. As shown in FIGURE 2, the output of the third stage of the counter is connected to a variable pulse generator 80. Pulse generator 80, upon receipt of a signal from counter 78, will provide an output pulse of the desired duration and of intensity sufficient to overcome the blocking bias on control electrode 22 of the electron beam machine. Thus, after the short time delay needed for counter 78 to register three counts, pulse generator 80 will provide a control signal which gates the electron beam on. During the time that the beam is gated on, it is often desirable to supply some movement to the beam in order to produce a stronger weld. If such movement, rather than a spot weld, is desired, function generator 76 may be utilized to also provide a sinusoidal deflection voltage to the x axis deflection coils and a D.C. deflection voltage to the y axis deflection coils during the time that the beam is gated on. As long as an output signal is provided to counter 78 by multivibrator 74, the counter will continue to count. When a sufficient time interval has elapsed to perform the desired work, the counter will provide a second output signal. As shown in FIGURE 2, this output signal is taken from the tenth stage of the counter and is applied to a monostable multivibrator 82. Multivibrator 82 will provide a single output pulse of sufficient duration to perform a plurality of functions. First, the output pulse is applied to a reset circuit 84 which clears storage device 70 and also resets sweep generator 60. To accomplish the foregoing, reset circuit 84 will operate in the same manner as above described reset circuit 58. The output pulse from multivibrator 82 is also applied to step voltage generator 72 and causes it to step to the next position. At the same time, the output of multivibrator 82 also triggers multivibrator 74 to cause it to return to its initial state thereby removing the activating signals from relay Ry3, function generator 76 and counter 78. Thus, the steady beam and image orthicon deflection voltages provided by step voltage generator 72 are stepped to their next value and, in response to the output of sweep generator 60, the next incremental area of the image is scanned; the combined deflection voltages being simultaneously stored and applied to both the EBM and image orthicon deflection coils. The work cycle is then repeated until the entire image has been scanned.

Since the total number of points at which work is to be performed is known, it is, by means well known in the art, possible to automate the entire operation. To accomplish the foregoing, a counter, not shown, can be connected to the tenth stage of counter 78. The stage of this counter corresponding to the number of points to be worked can be connected to table and air lock controls. Thus, when the desired number of operations have been performed, this additional counter will have received the requisite number of signals from counter 78. A signal will then then be generated, possibly by a tape control, which will command the table which is in the work chamber 12 to move into exit air lock 78 while simultaneously ordering a new table to move into position under the prims. Also, at this time, an erase command will be transmitted to the memory tube which has been exercising authority over the electron beam machine to clear this tube for a new read in. The erasure of memory or storage tubes is known in the art and means for accomplishing the same have therefore not been shown. In the basic embodiment of FIGURE 1, erasing can be achieved simply by manually operating a switch to momentarily apply a D.C. potential to the conductive screen which forms a part of the storage element of the tube when a work program has been completed. For a more complete discussion of operation and erasure of storage tubes, reference may be had to U.S. Patent No. 3,115,592, issued December 24, 1963 to H. M. Scott et al.

While preferred embodiments of this invention have been shown and described, various modifications and substitutions may be made without deviating from the spirit and scope of this invention. Thus, while this invention has been discussed in terms of utilizing an electron beam as a tool, the beam from a solid or gaseous laser may be programmed by use of this invention, deflection and gating of the laser output being achieved by rotating mirrors or ultrasonic cells. Also it must be recognized that the control circuitry of FIGURE 2 is meant to be representative only. Other and faster operating circuitry may be utilized for this purpose. For example, the electro-mechanical relays shown in FIGURE 2 could be replaced by state-of-the-art electronic switches. In the alternative, the entire circuitry of FIGURE 2 might be replaced with a countdown circuit such as that disclosed in copending application Serial No. 212,834, now U.S. Patent No. 3,172,989, filed July 27, 1962, by G. E. Nelson and assigned to the same assignee as this invention. The important feature of this invention is that it permits automating of a tool capable of extremely fine work while eliminating the prior art requirements of high precision fixturing of the workpiece. Thus, by use of this invention, the cost of assembly of work such as a microcircuit is considerably reduced. At the same time, a new flexibility of operation of devices which utilize highly energized beams to perform work is achieved. Accordingly, this invention is described by way of illustration rather than limitation and accordingly, it is understood that this invention is to be limited only by the appended claims taken in view of the prior art.

What is claimed is:

1. Apparatus for working an article with an energized beam comprising:
    means for generating an energized beam,
    means for modulating said beam,
    means for deflecting the modulated beam,
    means for supporting an article to be worked by said beam,
    means for projecting an image of the article to be worked when said supporting means is located at a first position spatially displaced from said beam generating means,
    means for scanning said projected image and generating signals commensurate therewith,
    an image storage device,
    means applying said signals commensurate with the projected image to said storage device whereby an image of the article to be worked is stored,
    means responsive to the repositioning of said supporting means generally in line with said beam generating means for scanning said stored image and generating signals commensurate therewith,
    means responsive to said signals commensurate with the stored image for generating beam control signals, and
    means for applying said beam control signals to said beam modulating means whereby an image of the article to be worked may be stored and the article supporting means thereafter positioned generally in the path of the beam where work is performed thereon by the beam in response to the scanning of the stored image.

2. Apparatus for working an article with an energized beam comprising:
    means for generating an energized beam,
    means for modulating said beam,
    means for deflecting the modulated beam,
    means for supporting an article to be worked by said beam,
    means for scanning an image and generating signals commensurate therewith,
    image projecting means,
    means responsive to the positioning of said supporting means at a first location spatially displaced from said beam generating means for causing said projecting means to project an image of the article to be worked on said image scanning means,
    an image storage device,
    means for applying the signals generated by said image scanning means in response to the projection of the image of the article thereon to said storage device whereby the image of the article to be worked is stored,
    means responsive to the repositioning of said supporting means generally in line with said beam generating means for causing said projecting means to project the stored image on said image scanning means, means responsive to signals generated by said image scanning means in response to the projection of the stored image thereon for generating beam control signals, and means for applying said beam control signals to said beam modulating means whereby an image of the article to be worked may be stored and the article supporting means thereafter positioned generally in the path of the beam where work is performed thereon by the beam in response to the scanning of the stored image.

3. The apparatus of claim 2 wherein said image storage device comprises:

a storage tube which will present an image, said storage tube comprising means for generating a writing electron beam and means for deflecting said writing beam.

4. The apparatus of claim 3 further comprising:

means for synchronizing said image scanning means and the beam deflecting means of said storage tube.

5. The apparatus of claim 4 wherein said image scanning means comprises:

a TV camera tube comprising a photo-cathode, means for generating a scanning electron beam, and means for deflecting said scanning beam.

6. The apparatus of claim 5 further comprising:

means for synchronizing the deflection of said scanning beam and said beam deflecting means.

7. The apparatus of claim 6 wherein said image projecting means comprises:

a rotating prism.

8. The apparatus of claim 7 wherein said means for generating an energized beam comprises:

an electron beam generator.

References Cited by the Examiner
UNITED STATES PATENTS

| 3,192,318 | 6/1965 | Schleich | 178—6.8 |
| 3,257,555 | 6/1966 | Klebba | 219—121 |

DAVID G. REDINBAUGH, *Primary Examiner.*

H. W. BRITTON, *Assistant Examiner.*